(12) United States Patent
McMillan et al.

(10) Patent No.: US 7,000,464 B2
(45) Date of Patent: *Feb. 21, 2006

(54) MEASURING AND CONTROL OF LOW FLUID FLOW RATES WITH HEATED CONDUIT WALLS

(75) Inventors: Robert M. McMillan, Georgetown, TX (US); Roland Rau, Georgetown, TX (US)

(73) Assignee: McMillan Company, Georgetown, TX (US)

( * ) Notice: Subject to any disclaimer, the term of this patent is extended or adjusted under 35 U.S.C. 154(b) by 174 days.

This patent is subject to a terminal disclaimer.

(21) Appl. No.: 10/803,149

(22) Filed: Mar. 17, 2004

(65) Prior Publication Data

US 2004/0173019 A1 Sep. 9, 2004

Related U.S. Application Data

(63) Continuation-in-part of application No. 10/156,402, filed on May 28, 2002, now Pat. No. 6,736,005.

(51) Int. Cl.
*G01F 1/68* (2006.01)

(52) U.S. Cl. ................... 73/204.21; 73/204.27

(58) Field of Classification Search ............. 73/204.11, 73/204.15, 204.16, 204.17, 204.23, 204.27, 73/204.21

See application file for complete search history.

(56) References Cited

U.S. PATENT DOCUMENTS

| 956,785 A | 5/1910 | Thomas |
| 2,087,170 A | 7/1937 | Stephenson |
| 2,552,017 A | 5/1951 | Schwartz et al. |

(Continued)

*Primary Examiner*—Harshad Patel
(74) *Attorney, Agent, or Firm*—Bracewell & Giuliani LLP

(57) ABSTRACT

The flow of a fluid at low flow rates is measured in a flow sensing assembly and controlled without introducing measuring devices into the fluid flow path. The flow sensing assembly is enclosed in a housing to lessen ambient and fluid temperature change effects on the measurements obtained. As the fluid is flowing through tubing in the flow sensing assembly, the tubing is heated to impart heat to the fluid. Heat sensors are attached at spaced positions from each other along the tubing in the direction of fluid flow to sense temperatures. The amount of heat applied to the tubing is controlled to maintain an established temperature differential between the heat sensors. The amount of heat applied is measured to provide an accurate and proportional indication of the fluid flow rate.

22 Claims, 9 Drawing Sheets

U.S. PATENT DOCUMENTS

| | | | |
|---|---|---|---|
| 2,591,195 A | 4/1952 | Picciano | |
| 265,800 A | 8/1954 | Natelson | |
| 2,777,325 A | 1/1957 | Groenhof et al. | |
| 3,138,025 A | 6/1964 | Fingerson | |
| 3,335,606 A | 8/1967 | Scarpa | |
| 3,757,808 A | 9/1973 | Peterson et al. | |
| 3,857,458 A | 12/1974 | Ohtani et al. | |
| 3,992,940 A | 11/1976 | Platzer, Jr. | |
| 4,028,689 A | 6/1977 | Schopp | |
| 4,087,301 A | 5/1978 | Steadman | |
| 4,135,396 A | 1/1979 | Stanke et al. | |
| 4,255,968 A | 3/1981 | Harpster | |
| 4,257,450 A | 3/1981 | Ollivier | |
| 4,357,936 A | 11/1982 | Ellestad et al. | |
| 4,458,709 A | 7/1984 | Springer | |
| 4,480,467 A | 11/1984 | Harter et al. | |
| 4,491,024 A | 1/1985 | Miller, Jr. | |
| 4,532,811 A | 8/1985 | Miller, Jr. et al. | |
| 4,554,136 A | 11/1985 | Chai et al. | |
| 4,690,245 A | 9/1987 | Gregorich et al. | |
| 4,813,280 A | 3/1989 | Miller, Jr. et al. | |
| 4,877,051 A | 10/1989 | Day | |
| 5,035,138 A | 7/1991 | Abdel-Rahman | |
| 5,036,701 A * | 8/1991 | van der Graaf | 73/204.12 |
| 5,092,170 A * | 3/1992 | Honstvet et al. | 73/295 |
| RE34,104 E | 10/1992 | Takahashi et al. | |
| 5,209,115 A * | 5/1993 | Bond | 73/295 |
| 5,222,395 A | 6/1993 | Matubara et al. | |
| 5,764,539 A | 6/1998 | Rani | |
| 5,765,432 A | 6/1998 | Lock et al. | |
| 5,831,159 A | 11/1998 | Renger | |
| 5,836,693 A | 11/1998 | Stulen et al. | |
| 5,911,238 A | 6/1999 | Bump et al. | |
| 5,980,102 A | 11/1999 | Stulen et al. | |
| 6,032,525 A * | 3/2000 | Suetake | 73/204.15 |
| 6,119,710 A | 9/2000 | Brown | |
| 6,318,171 B1 * | 11/2001 | Suzuki | 73/204.27 |

\* cited by examiner

Actual Flow vs. Indicated Flow

Deviation of Response

Repeatability 0-10 Lpm Air

Deviation of Response
LPM Air

MEASURING AND CONTROL OF LOW FLUID FLOW RATES WITH HEATED CONDUIT WALLS

CROSS-REFERENCE TO RELATED APPLICATIONS

The present application is a continuation-in-part of our U.S. patent application, "High Accuracy Measuring and Control of Low Fluid Flow Rates," Ser. No. 10/156,402 filed May 28, 2002, now U.S. Pat. No. 6,736,005.

BACKGROUND OF THE INVENTION

1. Field of the Invention

The present invention relates to measuring and control of fluid flow, particularly at low fluid flow rates. More particularly, the present invention permits such measurement and control without introducing measuring sensors or devices into the path of the fluid flow.

2. Description of the Related Art

Measurement of the flow or flow rate of a fluid in a conduit, particularly, at very low fluid flow rates, has been a problem if attempted using conventional flow sensors. At very low flow many fluid sensors do not operate properly. For example, velocity flow meters such as turbine wheel flow sensors cease to operate due to there being insufficient energy in the fluid to rotate the wheel. Differential pressure flow sensors can at times operate at low flows, but the smaller flow orifices required for low flows have been prone to obstruction if there were suspended particles in the fluid. Also, pressure drops across the orifices could be significant.

Most thermal flow sensors have the temperature sensing mechanism as a resistance bridge circuit or as a part of the entire temperature variant area whereby a change in flow has the equal and opposite effect on the two halves of the sensor. This can have a limiting effect on the range of the sensor and ambient temperature changes can affect the accuracy.

Specialized flow sensing techniques have been attempted in certain cases. For example, U.S. Pat. No. 5,035,138 used a resistive material formed of a special alloy as a tube or conduit through which a gas flowed. The special alloy was selected because of a high electrical resistivity and a high temperature coefficient of resistance. A voltage differential was applied to the resistive alloy conduit at defined positions. The resistive material of the conduit was used to heat the fluid flowing in it according to the voltage differential applied. The resistive alloy material tube acted both to heat the fluid and as an indicator of flow conditions. Spaced portions of the tube wall served as temperature sensitive resistors which developed a voltage differential as flow rates through the tube varied. The flow sensor of this patent required that the fluid tube or conduit be formed of a special resistive alloy having a high change in resistance value as a function of temperature change.

SUMMARY OF THE INVENTION

Briefly, the present invention provides a new and improved system for measuring the flow of fluid in a conduit which is transporting the fluid. The system includes a flow sensing assembly contained in a housing which reduces unwanted temperature effects on the flow sensing measurements. The flow sensing assembly includes a set of at least two heat detectors mounted on the conduit in the flow sensing assembly at spaced positions from each other on the conduit. The heat detectors measure the temperature of the fluid and conduit at the spaced positions. A set of at least two power applicators is mounted on the conduit at different locations along the conduit. The power applicators apply electrical power in the form of pulses of electrical current to the conduit to heat the conduit and the fluid in the conduit at an established temperature differential between the different locations. A control mechanism measures the level of power furnished to the power applicators to maintain the established temperature differential, and thus provide an indication of the flow rate based on the energy measured by the control mechanism.

The present invention is also adapted to control the flow of fluid at a measured rate of flow. A flow regulating valve responsive to the measure of the fluid flow is provided to control the flow of fluid to a desired flow rate based on the measured fluid flow rate.

The present invention does not require that any sensing devices be placed in the path of fluid flow in the conduit, and thus also affords a straight-through flow design for the conduit. The present invention requires only a small temperature differential for flow rate measurement and does not degrade temperature sensitive fluids.

The present invention also makes flow rate measurements while causing a relatively low pressure drop. The conduit in which flow is measured according to the present invention is formed of an electrically conductive material such as stainless steel, and the interior of the conduit may be coated with a suitable corrosion-resistant synthetic resin film.

DETAILED DESCRIPTION OF THE PREFERRED EMBODIMENTS

Figure 1:
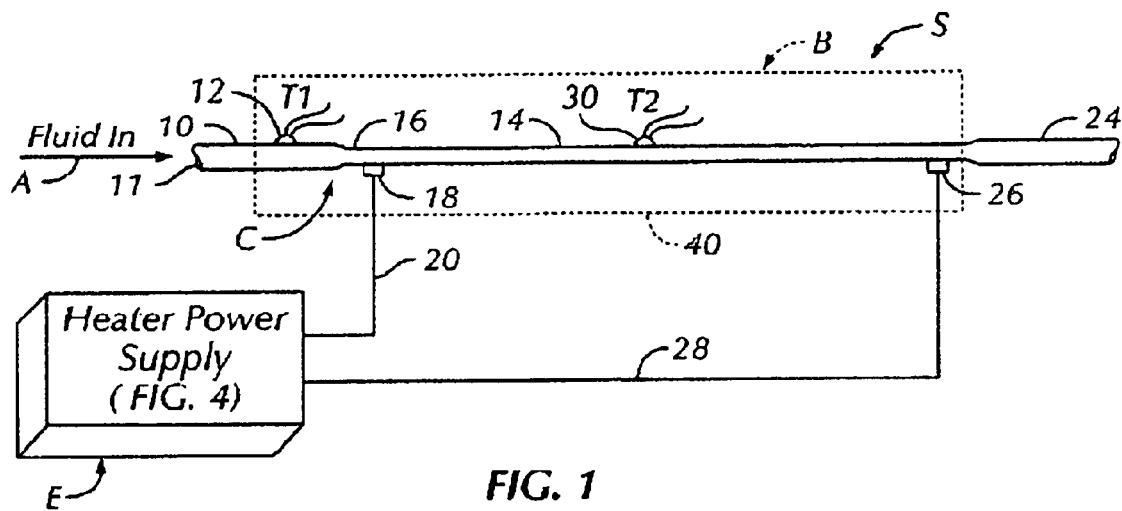
FIG. 1 is a side elevation view, taken partly in cross-section, of a flow rate sensor according to the present invention.
Figure 2:
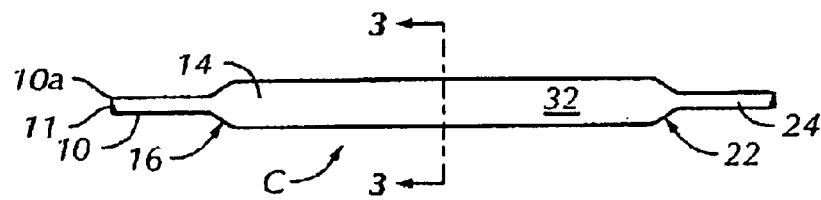
FIG. 2 is a plan view of a conduit in the flow rate sensor of FIG. 1.

In the drawings, the letter S designates generally a system according to the present invention for measuring the flow of fluid in a direction indicated by an arrow A through a conduit C which is enclosed in a housing body B. The fluid may be a gas or a liquid, and the present invention is particularly adapted for measuring low flow rates of fluid in the conduit C. As will be set forth, the system S of the present invention may sense flow rates of milliliters per minute of fluids, such as gasses or liquids.

The conduit C includes an inlet section 10 for incoming flow of fluid being measured according to the present invention. The conduit C is made of conventional stainless steel having low resistance to electrical current, such as 304 or 316 stainless steel. Such a material has a low thermal coefficient of resistance, which minimizes change in the resistance of the conduit C with change in temperature. The inlet section 10 is cylindrical in cross-section for the flow of fluid within an interior passageway 11 surrounded by a cylindrical tubular wall 10a. In one embodiment of the present invention, the inlet section 10 has an outside diameter of 0.050" and an inner dimension of 0.02". If the fluid which is being measured for flow rate according to the present invention is a corrosive fluid, the interior wall 10a of the conduit C may be coated or sleeved with a suitable corrosion-resistant material, such as a fluorinated hydrocarbon or other corrosion-resistant synthetic resin film coating.

A first heat detector or thermocouple 12 or other suitable heat sensing device capable of forming an electrical indication of sensed temperature is attached by suitable techniques to the inlet section 10. The thermocouple 12 senses ambient or reference temperature of the tube inlet section 10 and the incoming fluid to be measured in the system S. A heat transfer section 14 is formed in the conduit C in the downstream direction of fluid flow from a transition area 16 of the inlet section 10. In the transition area 16, the conduit C changes from a cylindrical or tubular cross-section to one better adapted for heat transfer as will be set forth.

Figure 3:
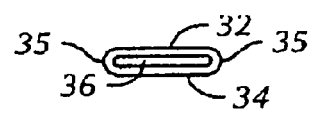
FIG. 3 is a cross-sectional view taken along the lines 3—3 of FIG. 2.

A power applicator electrical contact 18 in the form of a Monel solder tab or other suitable connector is formed such as by clamping or laser welding or similar techniques on the heat transfer section 14 of the conduit C. The contact 18 is in mechanical and electrical contact with the section 14 for connection through an electrical conductor 20 to an electronic control circuit E (FIGS. 1 and 3) of the system S. In the preferred embodiment, the conductor 28 is a copper braid conductor although it should be understood that other suitable electrical conductors may be used. With the present invention, the reference temperature sensing thermocouple 12 is located outside of, and upstream, of the heat transfer section 14.

The heat transfer section 14 of the conduit C extends from the transition area 16 to a second transition area 22 communicating with a cylindrical outlet portion 24. The conduit C reverts to a cylindrical cross-section in the second transition area 22. A power applicator electrical contact 26 of like or similar form to the electrical contact 18 is formed on the conduit C in a comparable manner to the contact 18 adjacent the transition area 22 and the outlet portion 24. The electrical contact 26 is connected to the electronic circuit E by a conductor 28 of like or similar form to the conductor 20. A second heat detector or thermocouple 30 or other suitable heat sensing device of a same or comparable type to the thermocouple 12 is mounted on the conduit C.

In the preferred embodiment, the second heat detector thermocouple 30 is mounted on the conduit C between the location of the applicators 18 and 26. It has been found with the present invention that a preferable location is midway between the applicators 18 and 26 or at a generally central location in the heat transfer section 14. The second heat detector 30 is located a suitable spaced distance along the heat transfer section 14 from thermocouple 12 to sense the temperature of the conduit C and its fluid contents at a location allowing for a measurable temperature differential to exist. The second temperature sensor thermocouple 30 detects any rise in temperature of the heat transfer section 14. Thus, for a fixed or given rise in temperature, the differential response is not sensitive to changes in ambient temperature of fluid entering the system S. This, in conjunction with the stainless steel material of the conduit C discussed above, makes the output of the sensor less sensitive to changes in ambient temperature of the fluid. This is in contrast to flow sensors that rely on a change of resistance of the sensing element as the heat transfer rate changes with the rate of flow of the fluid.

As will be set forth, electrical current flows through the heat transfer section 14 in the walls of the conduit C between the electrical contacts 18 and 26 to maintain a specified temperature differential between the spaced location of the thermocouples 12 and 30 on the conduit C.

The heat transfer section 14 may be flattened, using a press or other suitable mechanism, over the extent of the heat transfer area from the transition section 16 to the transition section 22 for more efficient heat transfer from the conduit C to the fluid contained in it. For example, heat transfer section 14 is flattened over a length of less than 1 inch, preferably about 0.40 inch, from the cylindrical or tubular shape of the inlet and outlet sections 10 and 24. The resulting heat transfer section is a flattened ellipse in cross-section, having a lateral extent, as is shown by generally flat upper walls 32 and 34. The upper and lower walls 32 and 34 are connected at their end sections by arcuate side walls 35 (FIG. 3) about a flattened inner passageway 36 which is 0.046" wide and 0.020" high. If desired, the heat transfer section need not be flattened fully to the flattened ellipse, but may be a more oval ellipse, depending on the required amount of heat transfer.

The configuration of the heat transfer section 14 improves thermal contact between the heat-bearing mass of the walls of the conduit C and the fluid passageway 36 and provides for thermal uniformity of the fluid in the conduit C as it travels through the heat transfer section 14. As noted, the flattened cross-section configuration of the heat transfer section 14 may be any suitable degree of elliptical or oval shape to achieve the desired heat transfer without introducing significant pressure drops over the range of fluid flow rates up to the maximum flow rate expected in the fluid being measured.

Figure 11:
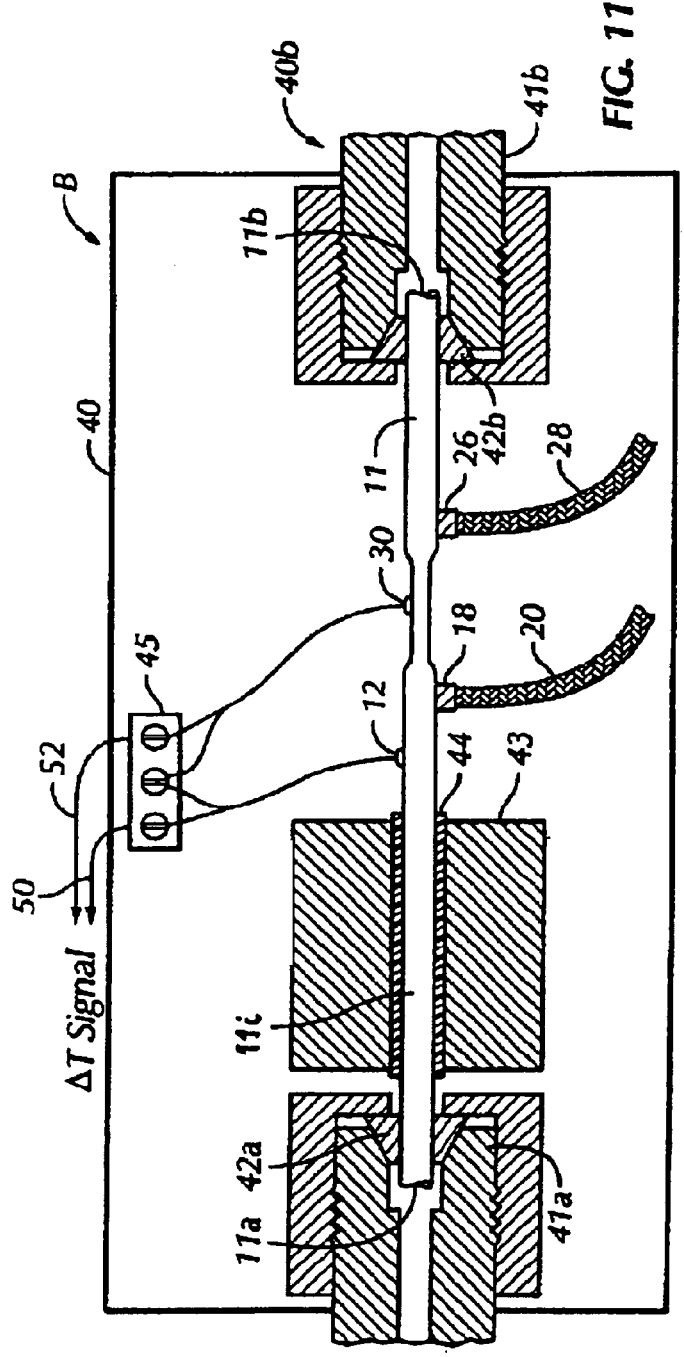
FIG. 11 is an elevation view, taken partly in cross-section, of another embodiment of a flow rate sensor according to the present invention.

The flow sensing assembly S is entirely enclosed in a conductive metal, preferably aluminum, block housing 40 (FIG. 11) of the housing body B. The flow conduit 11 is a straight through tube with an entrance at one side of the block 40 and with an exit at an opposite side 40b of the block 40. The flow conduit 11 is fully enclosed within and does not extend outside of the boundaries of the block 40. As noted above, the flow tube 11 does not have externally attached heaters. Rather, the heating mechanism is accomplished by the attachment of electrical connectors 18 and 26 attached mechanically and electrically to the conduit C. The conduit C is supported at both ends by ferrules 42a and 42b. The ferrules 42a and 42b are of a suitable insulative synthetic resin, PTFE or graphite type material, both of which are excellent insulators.

The flow conduit 11 is subjected to electrical energy pulses between connectors 18 and 26. However, the flow conduit 11 is insulated from the block by the insulating ferrules 42a and 42b. Also, the conduit 11 is enclosed entirely within the body of the aluminum block 40. Thus, there is no electrical conduction to any entity outside the block 40.

Further, there should be no conduction of electrical currents to the outside environment through the fluid medium in the conduit 11. If the fluid medium is liquid such as DI or deionized water, the electrical resistance of the water is very high and no significant electrical path is present through the water. If the fluid medium is a more conductive liquid such as acids, then the fluid conduit 11 may, as noted above, have a corrosion protecting and insulating material attached to the internal wall of the conduit 11, such as PTFE or comparable synthetic resin coating. A synthetic resin coating of this type provides electrical insulation as well as corrosion resistance. The use of synthetic resin tubing for making external connections also minimizes any stray currents.

Additionally, any small electrical currents that might possibly be induced into the liquid within the conduit 11 are conducted to ground as the fluid passes in contact with stainless steel fittings 41a and 41b located at entry port 11a and exit port 11b of the flow conduit 11. The fittings 41a and 41b are in electrical and mechanical contact with the block 40.

A heat exchanger cylinder body 43 is positioned about an inlet portion 11i of the flow conduit 11 before the heat detector thermocouple 12. The heat exchanger body 43 is formed of a suitable material, such as aluminum or similar material. The heat exchanger body is electrically insulated from the conduit by a thin insulative wall section 44 or tubing of PTFE or other suitable synthetic resin. The tubing 44 is placed between the outer surface of the conduit 11 and the internal surface of the cylindrical shaped heat exchanger 43. Any void spaces between the heat exchanger 43 and the tubing 44 may, if desired, be filled with a heat sink compound. This is done to provide close thermal coupling between the heat exchanger and the conduit.

For a fluid entering the inlet port 11a of the flow sensor which is at a different temperature than ambient or the flow sensor block 40, the heat exchanger 43 allows the temperature of the fluid to equilibrate to the temperature of the block 40 by the time the fluid reaches the temperature sensor 12. The heat exchanger cylinder 43 inserted in and in close thermal contact with the aluminum block 40.

Temperature sensors 12 and 30 are electrically connected to a connector terminal block 45. The ΔT signal developed at lines 50 and 52 is, as noted above, the voltage derived from the subtracted voltages developed by the temperature sensors 12 and 30. The terminal block 45 is mounted within a recessed position within the aluminum block 40. Any temperature gradient possibly existing or imposed across the terminal block connections 45a and 45b might cause the thermocouple wire-copper wire junctions to act as new thermocouple junctions, which could cause an error in the ΔT signal. The terminal block 45 location in block 40 is provided to prevent such a signal error.

The flow sensor conduit 11, thermocouple heat sensors 12 and 30, and terminal block 45 are recessed into suitably formed receptor cavities of the aluminum block 40. The aluminum block 40 has sufficient mass so that the conduit, heat sensors, and terminal block experience a minimum of temperature distribution gradients as ambient and/or fluid temperatures change. Thus, the accuracy of the output measurements from the flow sensors are not affected by external environmental conditions. A cover plate to enclose the components of FIG. 11 within their respective cavities is provided. The contents in each cavity of the aluminum block 40 are thus sealed with the overlay plate composed of a lexon-type synthetic resin or other suitable material.

Alternatively, the conduit C may be located within an outer housing so that the flow of fluid is over the outer surface of the conduit C. The outer surface is preferably coated with a suitable corrosion resistant material, of the type discussed above. In such a case, the conduit or tube C has an outside diameter of 0.050" and has the instrumentation connections located within inner portions. The conduit C heats the fluid and the outer surface of the conduit C is in contact with the flow of the fluid for heat transfer in the manner described above. This configuration allows use of a conduit which lends itself more readily to application of a corrosion-resistant coating. Also, sealing between the conduit C and the outer housing is easier to achieve and maintain.

The electronic circuit E of the present invention provides electrical power in the form of electrical current which is furnished to power applicator electrical contacts 18 and 26 to heat the fluid in the conduit C and maintain an established temperature differential between the locations of the heat detector thermocouples 12 and 30. The thermocouples 12 and 30 may be, for example, conventional type J or type K thermocouples or other suitable types of comparable operation and characteristics. The electronic control circuit C also provides an output that is indicative of the level of power furnished to the electrical contacts 18 and 26 to maintain the established temperature differential so that a measure of the fluid flow rate may be provided by an indicator D.

Figure 4:
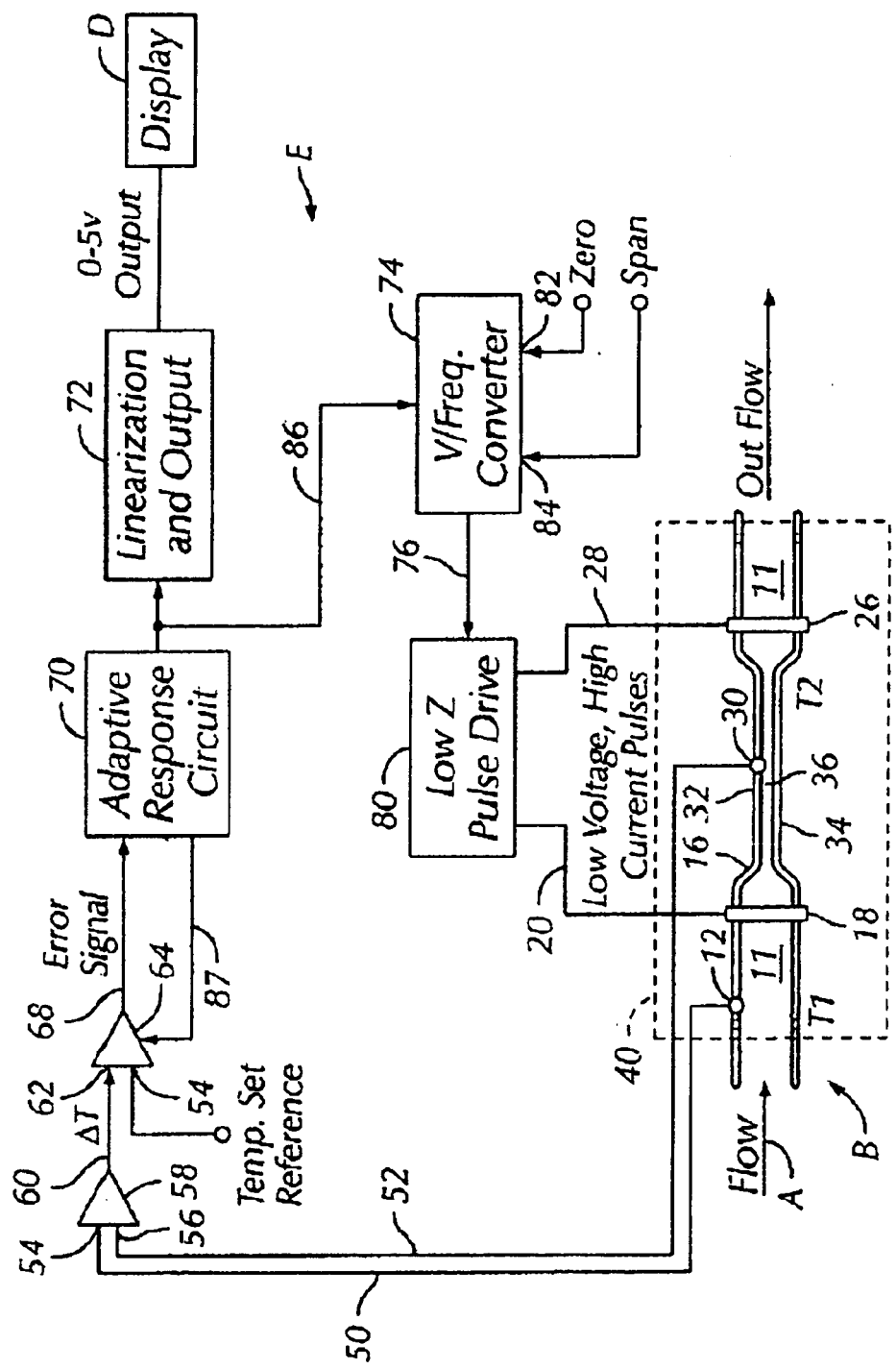
FIG. 4 is a functional block diagram of electronic components of an electrical circuit of the flow rate sensor of FIG. 1.

In the electronic circuit E (FIG. 4) of the system S, the thermocouples 12 and 30 are connected by electrical connectors 50 and 52 to inputs 54 and 56, respectively, of a low noise stabilized differential amplifier 58. The differential amplifier 58 is a conventional one, a commercially available low noise stabilized amplifier of the type providing for temperature stability of measurements furnished to subsequent amplifier stages. Differential amplifier 58 forms an output signal on a lead 60 representing the temperature difference ΔT between that sensed by the temperature sensing thermocouples 12 and 30 on the conduit C.

The temperature differential signal on the lead 60 is furnished to a first input 62 of a comparator or instrumentation amplifier 64. The comparator amplifier 64 is part of an instrumentation amplifier of the conventional type which receives at a second input 66 a signal level representing a reference temperature differential setting. The comparator amplifier 64 forms an output error signal on a lead 68 representing the variation of the temperature differential sensed between the temperature sensors 12 and 30 on the conduit C and the reference temperature differential provided to the second input 66.

Included in or provided to the instrumentation amplifier 64 is an internal reference voltage that is used to develop a temperature set reference applied to the input of the comparator amplifier. The instrumentation amplifier 64 also provides for control of the gain of the comparator amplifier, thus providing control of the gain of the error signal output 68, the purpose of this function is described in more detail below.

Figure 6:
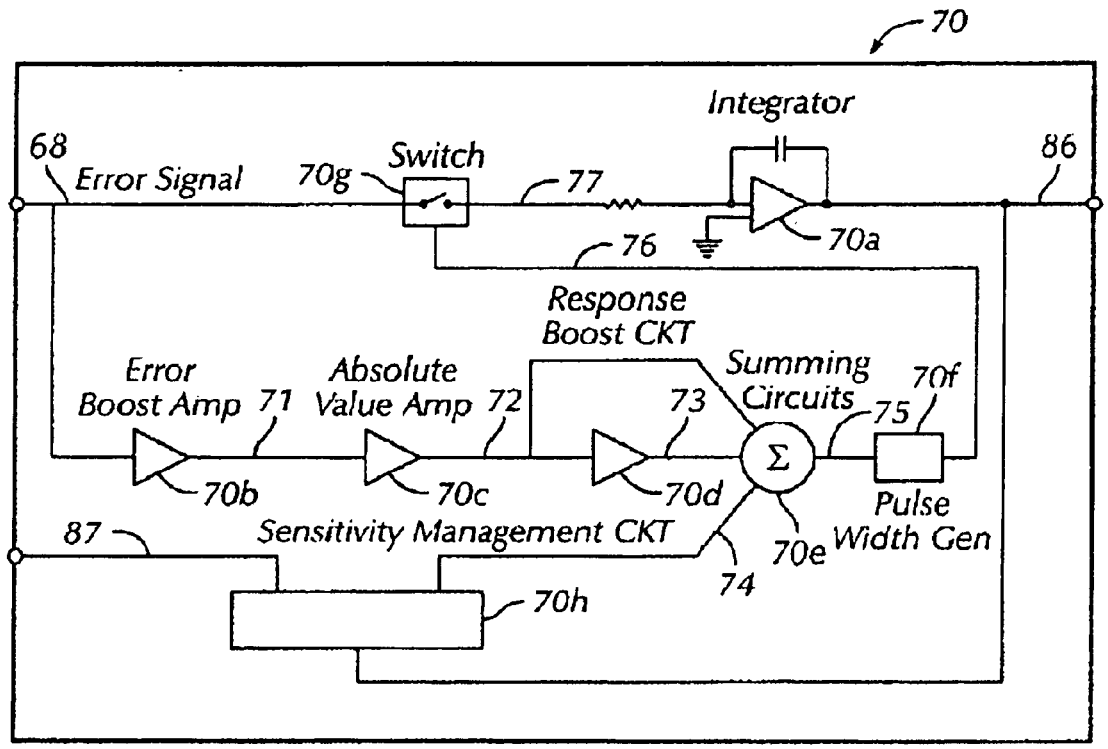
FIG. 6 is a schematic diagram of an adaptive response unit of the circuit of FIG. 4.

The output error signal from the comparator amplifier 64 is furnished on a lead 68 to an adaptive response circuit 70 (FIG. 6). The adaptive response circuit 70 includes an integrator 70a, an error signal boost amplifier 70b, an absolute value amplifier 70c, a response boost circuit 70d, a summing junction and signal level shift circuit 70e, a pulse width generator circuit 70f, a bi-directional switch 70g, and a signal response sensitivity modulator 70h.

The adaptive response circuit 70 does not use fixed filtering or integration time. The tracking response of the circuit 70 is varied to provide fast response at high flow and slow response at zero or near zero flow, which is necessary due to the wide range of the thermal response of the flow tube as the flow changes between the maximum and minimum flow rates of the flow range established for the system S. Additionally, the tracking response is reduced as the rate of flow approaches zero to provide an output with minimum fluctuations.

The input to the adaptive response circuit on line 68 is the error signal developed from the instrumentation amplifier 64. The error signal is amplified by the error signal boost amplifier 70b, the gain being determined by the amplitude of the error signal. At very low amplitude, the amplifier 70b has higher gain to increase the response of the flow sensing to a very small change in flow rates. At a predetermined higher amplitude of the error signal, the gain of the amplifier 70b is reduced. The amplifier 70b provides a signal on conductor 71 which is bi-directional. The signal on conductor 71 is processed by the absolute value amplifier 70c to produce a single polarity signal regardless of the polarity of the signal on line 71. The purpose is to generate a control signal on conductor 72 that is responsive to the magnitude of the error signal as it deviates from zero volts. An error signal at a level of zero volts represents equilibrium of the flow sensor systems.

The output of amplifier 70c on line 72 goes a response boost circuit 70d. The response boost circuit 70d has no output until the input on line 72 exceeds a predetermined level. At such a time, the output on a line 73 increases to a level that forces the flow sensors to rapidly track a fast changing flow rate. When the error signal drops below the predetermined level, the output of response boost circuit 70d drops to no output and in effect slows the fast response of the system to prevent overshoot of the response.

An output signal on a line 74 from the sensitivity modulating circuit 70h becomes active when the flow rate is at or very near zero. The signal on conductor 74 also is provided to the summing junction 70c. The signal on line 74 has the effect of reducing the effects of control signals on lines 72 and 73 in a controlled manner. The summing circuit 70e provides an output on line 75 that goes to a pulse width generator 70f.

The magnitude of the signal on line 75 causes the pulse generator to develop a pulse output on conductor 76 that has a duty cycle of 0–96% dependent upon the control voltage input to the generator 70f. The pulse on line 76 turns switch 70g on and off according to the duration of the pulse width. The pulse width generator 70f is preferably a commercially available integrated circuit normally used in high efficiency power supplies. The switch 70g applies and isolates the continuity of the error signal to the integrator circuit 70a. The time constant of the circuit 70a is determined by the values of a resistor 70i and a capacitor 70j. This time constant can be increased by the percent of duty cycle of the pulse width generator output as controlled by the previously described input signal characteristics. The time constant of the integrator is now represented by the equation:

Time constant=$R_{70i} \cdot C_{70j}$/% duty cycle

The polarity and also the rate of change of the tracing response of integrator 70a is controlled by the magnitude and polarity of the error signal of line 68 applied to switch 70g. Thus the tracking response of the circuit 70 is represented by the equation:

Tracking Response Rage=error signal voltage/($R_{70i} \cdot C_{70j}$/% duty cycle)

The output of adaptive response circuit 70 on line 86 is fed back to the signal sensitivity management circuit 70h.

The flow sensor tube has an output that is linear up to some level of flow, at which point the sensitivity starts to decline due to the faster flow rate. This causes the temperature distribution in the flow tube to be displaced to such an extent that the output no longer increases in direct proportion to the flow rate. However, this effect is reproducible and can be compensated for.

Thus the signal on line 86 is processed by the circuit sensitivity management circuit 70h so that at certain predetermined levels of the signal on line 86, control signals are sent via line 74 to the summing circuit 70e as explained. The signal on line 86 is also provided via line 87 to the instrument amplifier 64 as the flow rate increases and sensitivity to flow change decreases, at predetermined levels. The gain of amplifier 64 is increased to compensate and provide an error signal that has the same sensitivity to flow rate change, regardless of the flow rate. This results in a fast, smooth response of the system over the whole flow range.

Without the compensation of adaptive response circuit 70, the system response would be sluggish at high flow and would overshoot or be out of control at very low flow rates. The adaptive response circuit 70 allows this flow sensor S to operate having a greater dynamic range that is normally presented. The term "turn-down-ratio" is know in the industry as the ratio of the maximum flow to the minimum flow capabilities of the flow sensor. The turn-down-ratio of flow sensing according to the present invention has been demonstrated to be relatively high, on the order of 200 or greater. The combined effect of the adaptive response circuit 70 allows the flow sensor to perform in a controlled manner to present an output that has a smooth, fast response over an extended flow range.

The output signal from adaptive response circuit 70 is also furnished to a linearization and output circuit 72 where the response signal is linearized and put in a suitable format, such as a suitable level of voltage of direct current 0–5V. Linearization and output circuit 72 may, for example, be in one embodiment, a multi-step correction circuitry, consisting of conventional operational amplifiers, that modulates the output of circuit 70 so that the output of circuit 72 represents an accurate indication of flow and provides a suitable level output signal.

The output signal from circuit 72 is provided for storage, processing and display purposes in a suitable indicator or display D, which may have a suitable record-keeping mechanism or memory associated therewith. The display D may be, for example, a Model 250 display available from McMillan Company, Assignee of the present application. If desired, the response signal may be converted into digital formal for digital processing, computation and storage in a suitable display D. The display output from the output circuit 72 represents the present value of the flow rate sensed of fluid in the conduit C by the system S according to the present invention.

The output response from 70a of amplifier 70c of adaptive response circuit 70 is furnished over conductor 86 to a voltage-to-frequency converter 74. The voltage-to-frequency converter 74 takes the form, for example, of the voltage-to-frequency portion of a commercially available phase-locked loop. It can be any suitable, commercially available voltage-to-frequency, or V/F, converter. The level of the output response from amplifier 70c of the adaptive response circuit 70 causes an appropriately correlated variation in the output frequency of a signal on conductor 76 from the converter 74. The output frequency from the converter 74 is furnished to a pulse driver circuit 80. The voltage-to-frequency converter 74 is provided with a signal at a zero input 82 and a span input 84, respectively, for calibration purposes.

Figure 7:
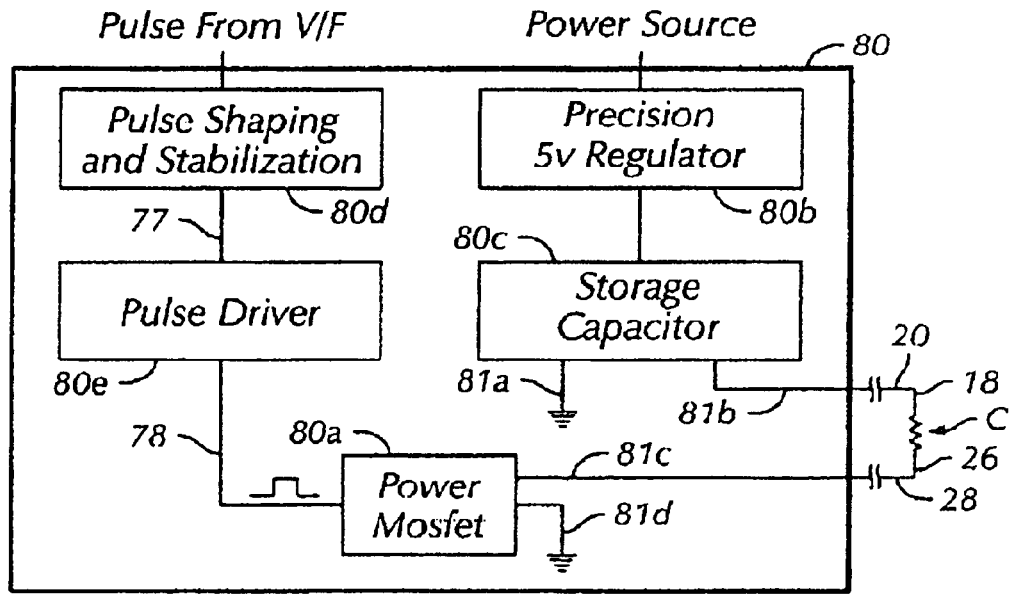
FIG. 7 is a schematic diagram of a pulse driver unit of the circuit of FIG. 4.

The pulse driver circuit 80 (FIG. 7) receives drive pulses over connector 76 from voltage-to-frequency converter 74. The pulse driver circuit 80 is connected through conductors 20 and 28 to electrical connectors 18 and 26, which are mounted with the tube or conduit C. The pulse driver circuit 80 includes an electrical switch 80a, preferably a MOSFET switch, a power regulator 80b connected to a suitable power source and a storage capacitor 80c storing electrical energy for flow as current pulses through the tube C. The pulse driver circuit 80 also includes a pulse shaping and stabilization circuit 80d and a pulse driver circuit 80e. The pulse driver circuit 80 is a low impedance pulse driver, providing low voltage, high current pulses when switch 80a is conductive. Operation of switch 80a is at a frequency governed by the output frequency of the voltage/frequency converter circuit 74. The low voltage, high current pulses from the pulse driver circuit 80 flow through the walls 32 and 34 of the flattened heat-transfer section 14 of the conduit C between the connectors 18 and 26.

The pulse shaping and stabilization circuit 80d receives a pulse from the voltage/frequency converter 74 on line 76 at a rate governed by the magnitude of the signal from the adaptive response circuit 70. The pulse shaping and stabilization circuit 80d converts pulses received to precision width pulses on output line 77 of approximately 25 microseconds. The pulse on line 77 is received by the pulse driver circuit 80e that further provides the signal requirements of appropriate level and form over conductor 78 to drive the input of power MOSFET switch 80a. The output pulses on line 78 from pulse driver circuit 80e turn the MOSFET switch 80a on and off in a very short duration of time to avoid power losses during the on and off transition time of the switch.

The pulse driver circuit 80 delivers precision, high peak energy pulses to the stainless steel flow-tube C to rapidly and precisely heat the tube C and the fluid flowing in it. Operation of pulse driver circuit 80 results in low average power being consumed; low energy losses; and the heat energy applied being proportional to the flow of the fluid.

When flowing liquids, considerable energy is required to raise the temperature of the flowing liquid, as compared to air. The heating conduit C, having a low electrical resistance, requires an efficient drive circuit capable of precision heating with a minimum loss of energy dissipated in other parts of the circuitry. The pulse driver circuit 80 is capable of controlling the large differences in power required when flowing high and low rates of liquids and gasses.

Figure 5:
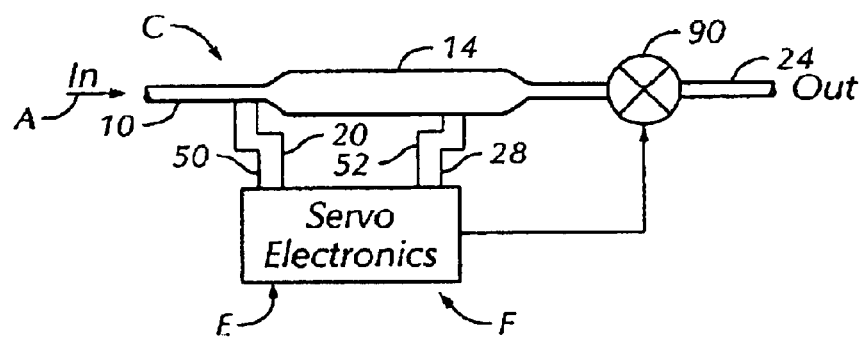
FIG. 5 is a functional block diagram of a flow control system according to the present invention.

The present invention may also be used to provide a flow control system F (FIG. 5). In the flow control system F like structure to that of the system S functioning in a like manner bears like reference numerals. In the flow control system F, the output signal from the linearization and output circuit 72 of the electronic circuit E is furnished to an electrically operated flow control valve 90 located in the conduit C downstream from the heat transfer section 14. Thus, as the flow rate of the fluid in the conduit C varies, the electronic circuit E provides indications to the flow control valve 90 to regulate the rate of flow of the fluid through the conduit C to a desired level. Flow control valve 90 may be of a conventional type or of a type available from the Assignee of the present application, McMillan Company.

While at first appearance to some, the practice of attaching electrical power to a conduit wall of very short length may seem to be a short circuit, and normally would, as the resistance of the conduit 11 in the enclosed embodiment of the present invention is in the order of 0.020 ohm. This, however, is not the case as those skilled in the art may recognize. All metallic materials have some finite resistance across a specified volume of their mass. Generally, this resistance changes to some degree with temperature changes. A current applied across such a resistance dissipates energy in the form of heat that increases the temperature of the material.

Even though the resistance of the short section of conduit 11 is very small, it still functions very well as a heater provided the power source has a sufficiently low resistance for efficient transfer of electrical energy. Because of the very low resistances involved, the power driver circuit of the present invention has very low internal resistances, as are required.

Figure 12:
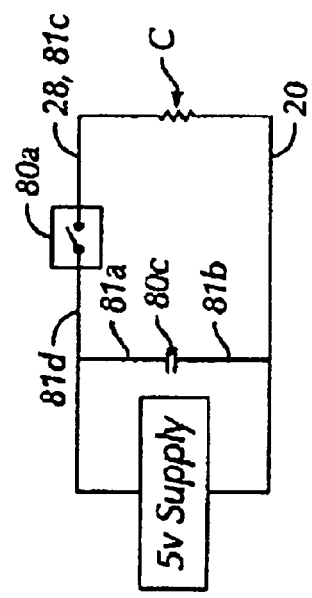
FIG. 12 is a schematic electrical circuit diagram of portions of the flow rate sensor of the present invention.

FIG. 12 is a simplified schematic electrical circuit diagram of the circuit to explain this. Referring to FIG. 12, in one example the combined resistance of conductor wires 20, 28, 81a, 81b, 81c, 81d, switch 80a, and internal and lead wire resistances of capacitor 80c is approximately 0.012 ohm. To provide small amounts of average power to control to a very tiny fraction of a degree Fahrenheit of temperature, full power is applied for a very short duration of time. In the present invention, power is applied for 25 microseconds per pulse. With fixed voltage, current, and pulse width, each pulse imparts the same amount of energy to the heated part of the conduit 11. The amount of heat required to maintain equilibrium of temperature with different flow rates of a fluid in the conduit is controlled by the frequency of the pulses applied to the conduit. The heating circuit is subjected to high current pulses, the energy being supplied by the storage capacitor 80c. The energy lost by the capacitor 80c is restored by a much lower current and during a longer period of time between pulses.

Figure 8A:
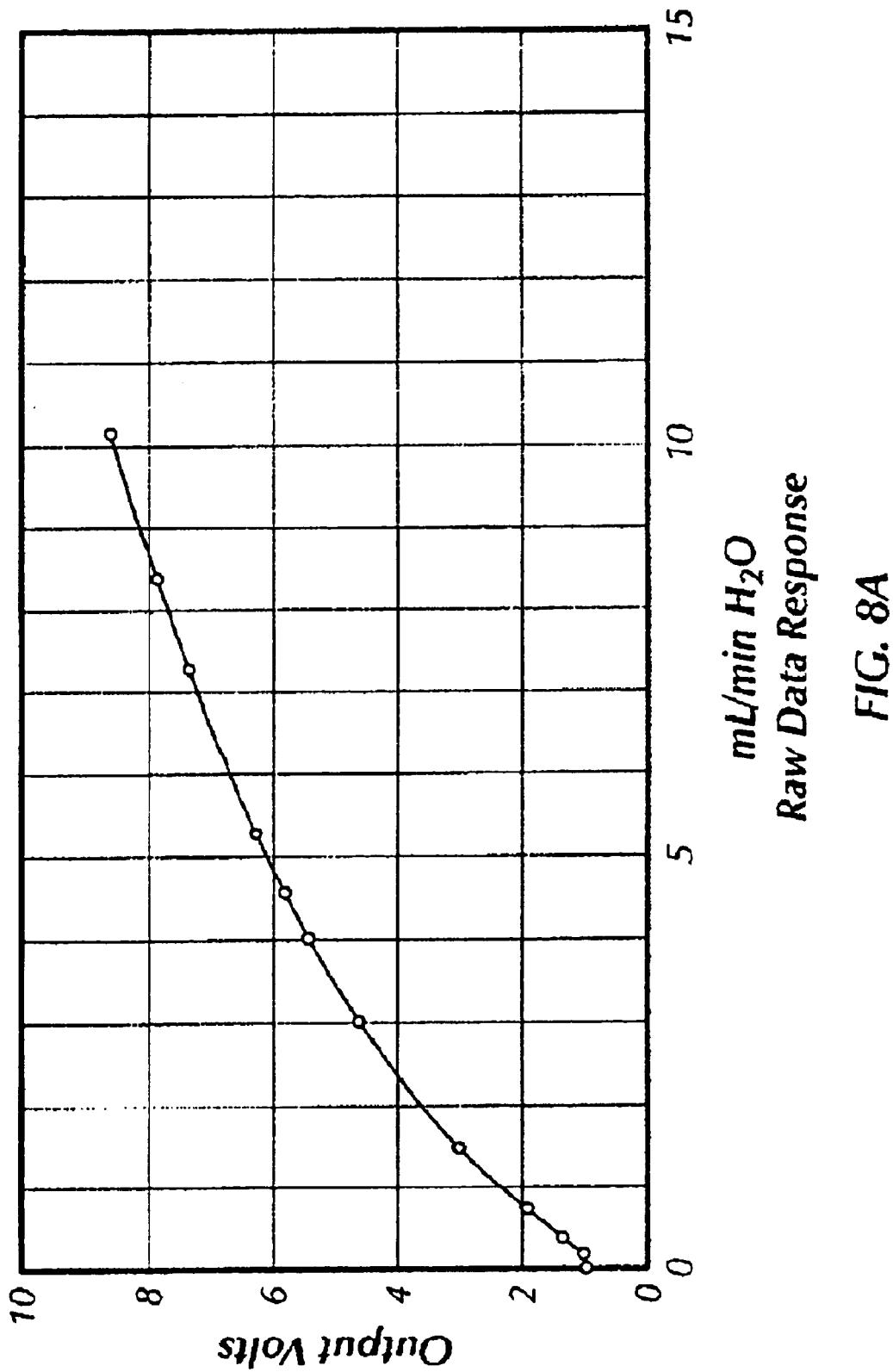
FIGS. 8A, 8B, 8C, 9A, 9B, 9C, 10A and 10B are graphs illustrating performance of a flow rate sensor according to the present invention.
Figure 8B:
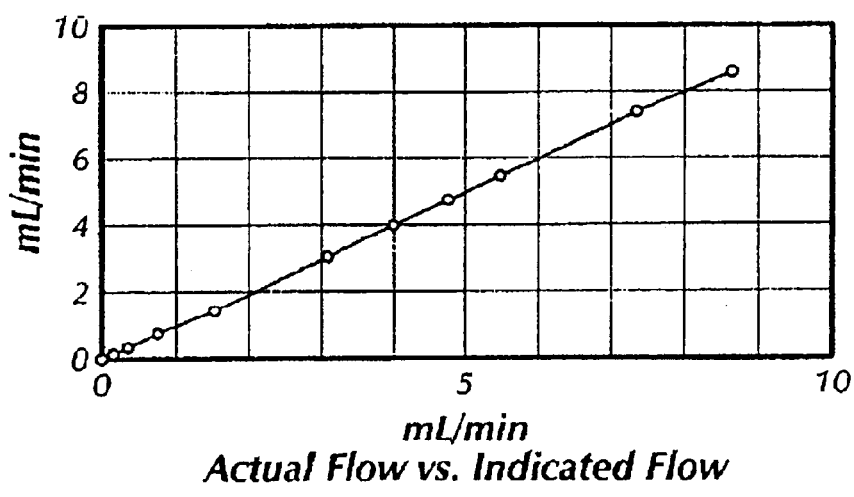
Figure 8C:
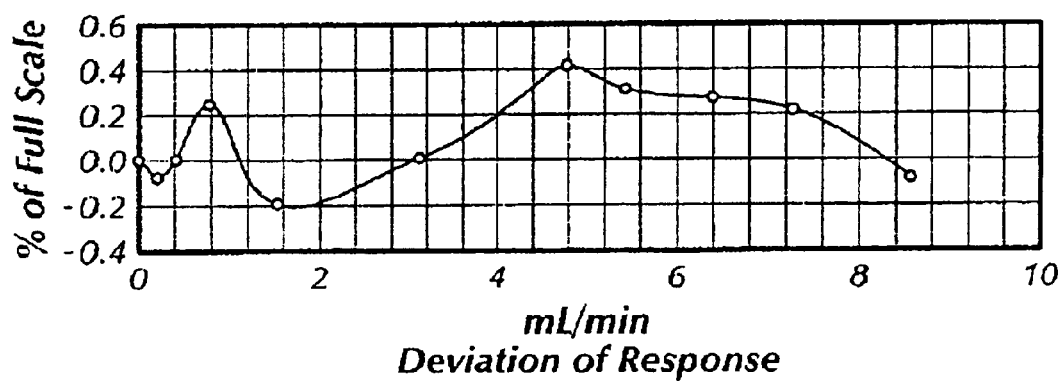
Figure 9A:
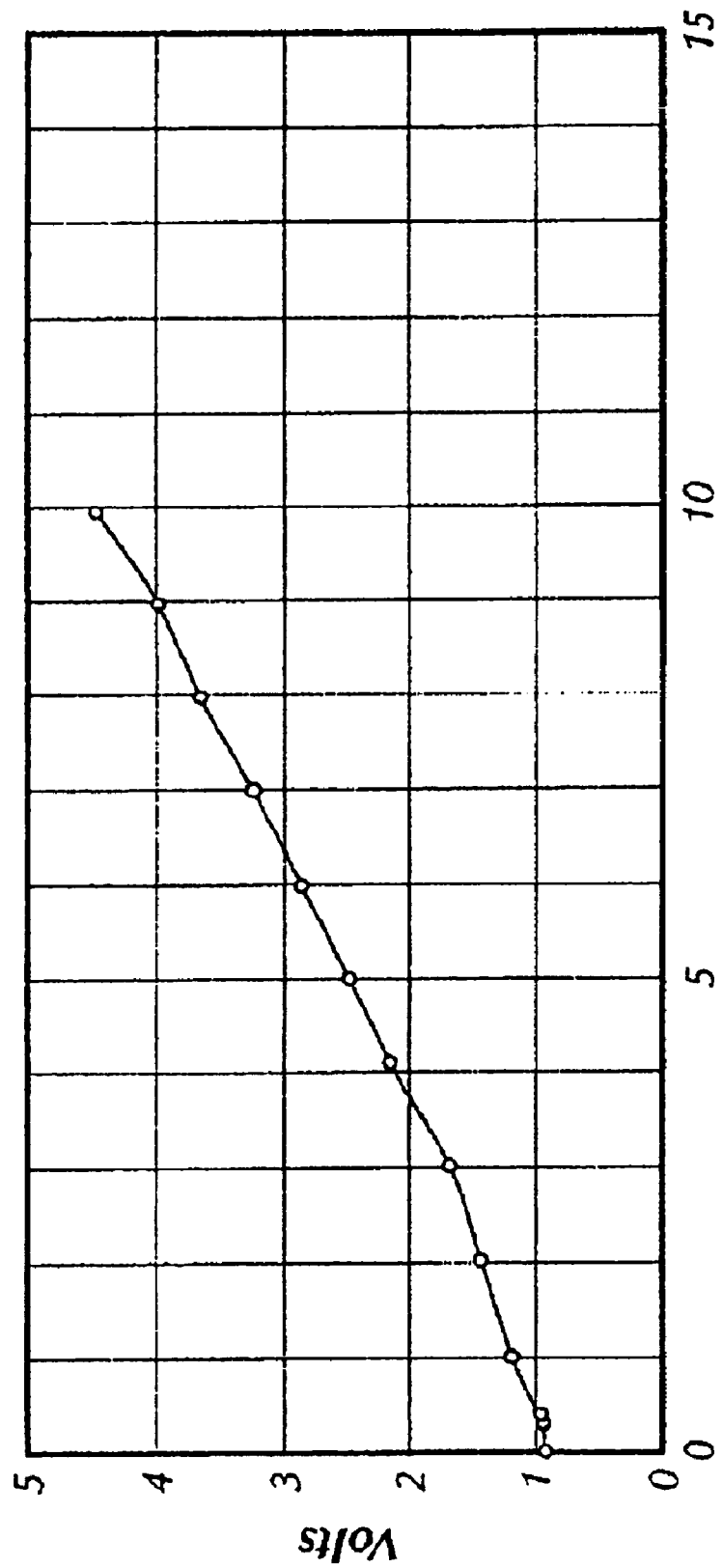
Figure 9B:
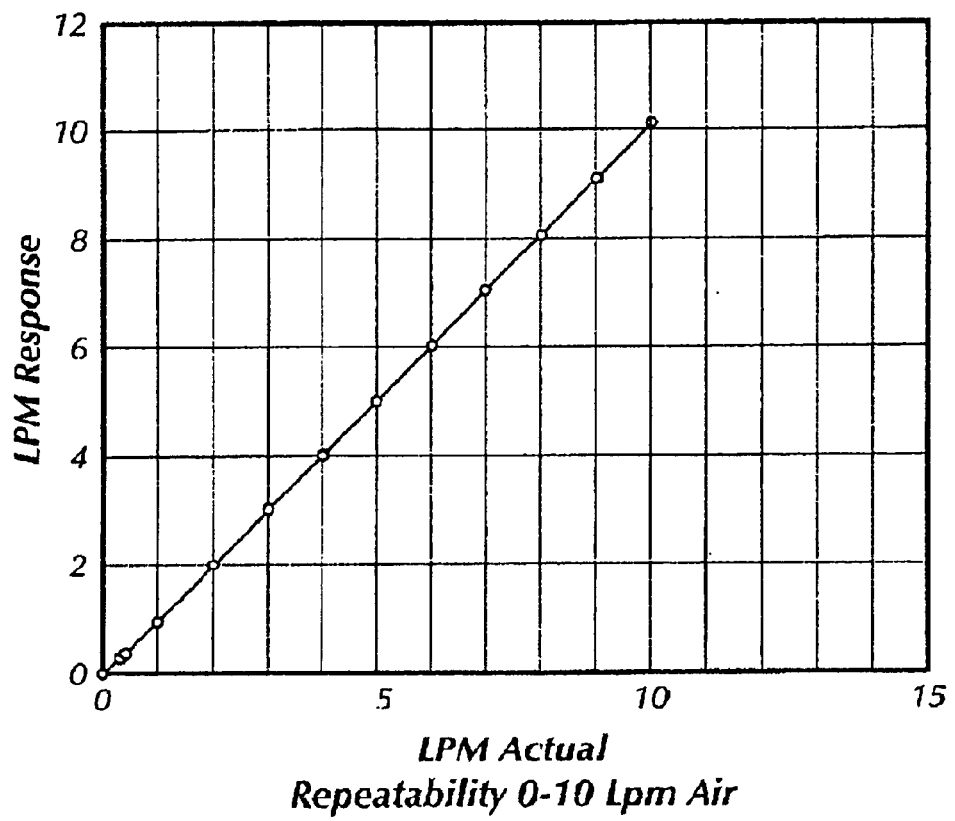
Figure 9C:
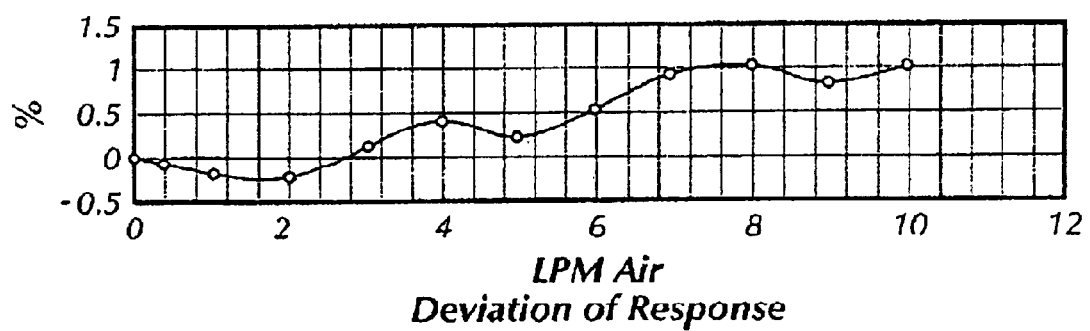

FIGS. 8A and 9A are basic response curves of a flow rate sensor according to the present invention to the flow of water and air, respectively, at the flow rates indicated. The data shown was obtained during preliminary testing and was obtained from the values and dimensions of the indicated flow tube C. Refinements and dimensional changes are expected to improve operating parameters for different flow rates and fluids. These figures illustrate a sensitive response to flow changes at low volume flow rates of these fluids. FIGS. 8B and 9B represent the responses of FIGS. 8A and 9A, respectively, after linearization. The linearized responses indicate the accuracy obtained with the flow sensor of the present invention at known input flow rates. In addition, FIGS. 8C and 9C indicate the accuracy obtained in the data of FIGS. 8B and 9B, respectively, as a percentage of full scale readings.

Figure 10A:
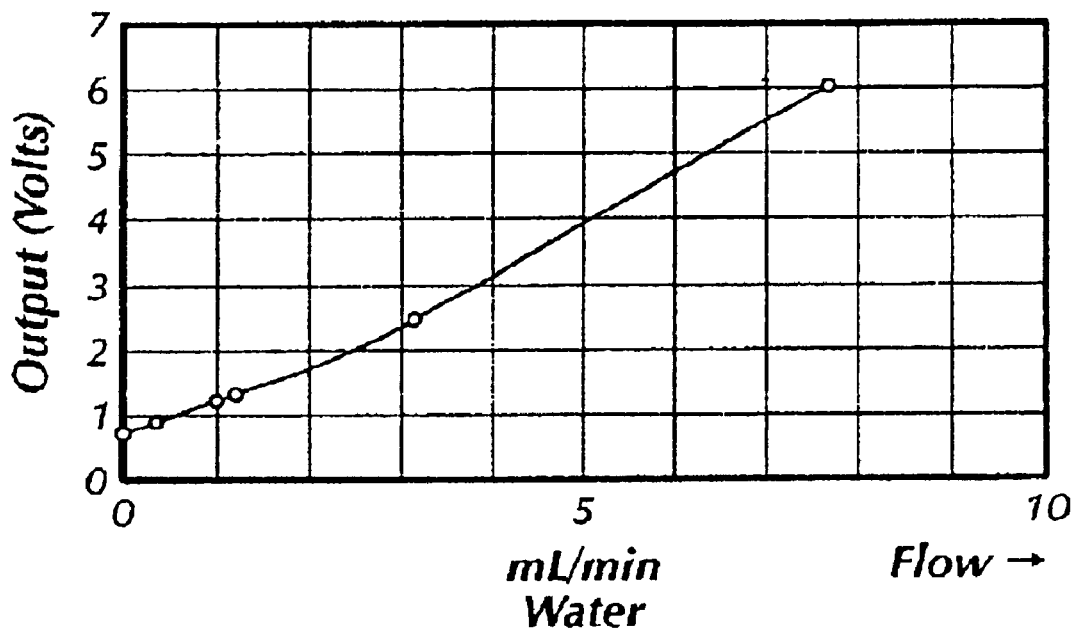
Figure 10B:
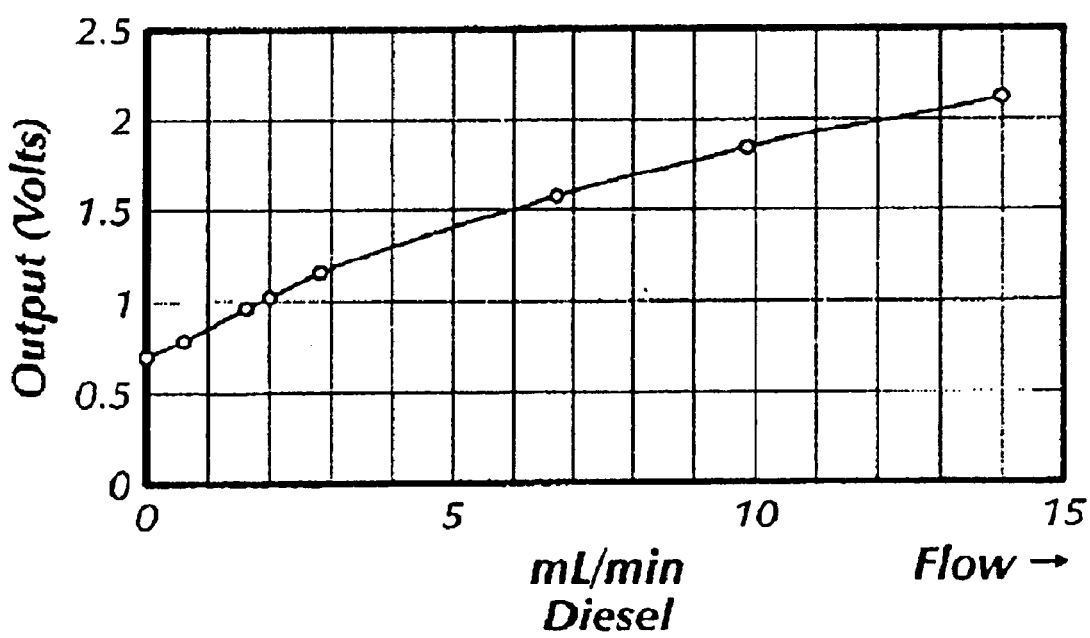

FIGS. 10A and 10B are plots of test data similar to that of FIGS. 8A and 9A, with water and diesel fuel being the liquid flowing at the milliliters/minute rates indicated. Comparable accuracy and sensitivity are indicated in FIGS. 10A and 10B to the results discussed above and shown in FIGS. 8A and 9A.

The present invention can be seen to provide a sensitive, accurate thermal flow sensor for fluids and gasses. The flow sensor of the present invention is a simple mechanical device which indicates a wide dynamic flow range. The flow sensor S of the present invention possess high efficiency and precision heating controls, and can be constructed of readily available components at low cost.

The foregoing disclosure and description of the invention are illustrative and explanatory thereof, and various changes in the size, shape and materials, and components, as well as in the details of the illustrated construction may be made without departing from the spirit of the invention.

What is claimed is:

1. A system for measuring the flow of fluid, comprising:
a flow sensing assembly, comprising:
conduit having walls for containing and transporting the fluid;
at least two heat detectors mounted at spaced positions from each other on the conduit walls and measuring the temperature of the fluid and conduit at the spaced positions;
at least two electrical power applicators mounted at different locations on the conduit and allowing electrical current to flow in the conduit walls to heat the fluid in the conduit and maintain an established temperature differential between the spaced positions;
a housing body having the flow sensing assembly contained therein;
a control mechanism for obtaining measurements of the level of power furnished to the electrical power applicators to maintain the established temperature differential between the spaced positions; and
an indicator mechanism responsive to the control mechanism providing a measure of the fluid flow rate based on the measurements obtained by the control mechanism.

2. The system of claim 1, wherein:
the housing body is formed of conductive material.

3. The system of claim 2, wherein:
the housing body is formed of a metal.

4. The system of claim 3, wherein:
the metal in the housing body comprises aluminum.

5. The system of claim 1, wherein:
a first heat detector is mounted on the conduit at a location upstream in the direction of fluid flow from the power applicators.

6. The system of claim 1, wherein the heat applicators include first and second heat applicators mounted on the conduit at spaced positions from each other and further including:
a second heat detector is mounted on the conduit between the locations of the first and second heat applicators.

7. The system of claim 6, wherein:
the second heater detector is mounted on the conduit midway between the locations of the first and second heat applicators.

8. The system of claim 1, where in the conduit walls have the form of flattened ellipses in cross-section between locations where the heat applicators are mounted.

9. The system of claim 1, further including:
a heat exchanger member enclosing the conduit along at least a portion of its extent in the housing body.

10. The system of claim 9, further including:
an insulative sleeve mounted in the housing body between the conduit and the heat exchanger member.

11. The system of claim 1, further including:
electrical conductors connecting the heat detectors to the control mechanism; and
a terminal block on the housing body for mounting the electrical conductors therewith.

12. The system of claim 1, wherein the heat detectors comprises thermocouples.

13. The system of claim 12, further including:
an amplifier forming a measure of difference in temperature sensed by the heat detector thermocouples.

14. The system of claim 1, further including:
a comparator forming a signal representative of the variation of the temperature difference measured by the heat detectors from an established temperature differential.

15. The system of claim 1, wherein the control mechanism includes:
an adaptive response circuit forming an indication of the variation of the temperature difference.

16. The system of claim 15, further including:
a driver circuit applying pulses of electrical current to the electrical power applicators.

17. The system of claim 16, further including:
the adaptive response circuit providing a control signal to the driver circuit based on the variation of the temperature difference.

18. The system of claim 16, further including:
the adaptive response circuit providing a control signal to the driver circuit based on the variation of the temperature difference.

19. The system of claim 15, further including:
a driver circuit applying pulses of electrical current to the electrical power applicators.

20. The system of claim 1, wherein the control mechanism includes:
an adaptive response circuit forming an indication of the variation of the temperature difference.

21. A system for controlling the flow of fluid at a measured rate of flow, comprising:
a flow sensing assembly, comprising:
a conduit having walls for containing and transporting the fluid;
at least two heat detectors mounted at spaced positions from each other on the conduit walls and measuring the temperature of the fluid and conduit at the spaced positions;
at least two electrical power applicators mounted on the conduit and allowing electrical current to flow in the conduit walls to heat the fluid in the conduit at and maintain an established temperature differential;
a housing body having the flow sensing assembly contained therein;
a control mechanism for obtaining measurements of the amount of energy furnished to the heat applicators to the established temperature differential between the spaced positions;
an indicator mechanism responsive to the control mechanism providing a measure of the fluid flow rate based on the measurements obtained by the control mechanism; and
a flow regulating valve responsive to the measure of the fluid flow rate to control the flow of fluid in the conduit.

22. A system for measuring the flow of fluid in a conduit, comprising:
at least two heat detectors mounted at spaced positions from each other on the conduit measuring the temperature of the fluid and conduit at the spaced positions;
an amplifier forming a measure of difference in temperature sensed by the heat detectors;
a comparator forming a signal representative of the variation of the temperature difference measured by the heat detectors from an established temperature differential;
at least two electrical power applicators mounted at different locations on the conduit and allowing electrical current to flow in the conduit walls to heat the fluid in the conduit and maintain an established temperature differential between the spaced positions;
a control mechanism for obtaining measurements of the level of electrical power furnished to the power applicators to maintain the established temperature differential between the spaced positions; and
an indicator mechanism responsive to the control mechanism providing a measure of the fluid flow rate based on the measurements obtained by the control mechanism.

* * * * *

UNITED STATES PATENT AND TRADEMARK OFFICE
CERTIFICATE OF CORRECTION

| | | |
|---|---|---|
| PATENT NO. | : 7,000,464 B2 | |
| APPLICATION NO. | : 10/803149 | |
| DATED | : February 21, 2006 | |
| INVENTOR(S) | : McMillan et al. | |

It is certified that error appears in the above-identified patent and that said Letters Patent is hereby corrected as shown below:

Column 12, Lns. 8-11, please cancel the text "18.  The system of claim 16, further including: the adaptive response circuit providing a control signal to the driver circuit based on the variation of the temperature difference." and insert the following claim:

-- 18.   A system for controlling the flow of fluid at a measured rate of flow, comprising:
a flow sensing assembly, comprising:
a conduit having walls for containing and transporting the fluid;
at least two heat detectors mounted at spaced positions from each other on the conduit walls and measuring the temperature of the fluid and conduit at the spaced positions;
at least two electrical power applicators mounted on the conduit and allowing electrical current to flow in the conduit walls to heat the fluid in the conduit at and maintain an established temperature differential;
a housing body having the flow sensing assembly contained therein;
a control mechanism for obtaining measurements of the amount of energy furnished to the heat applicators to the established temperature differential between the spaced positions;
an indicator mechanism responsive to the control mechanism providing a measure of the fluid flow rate based on the measurements obtained by the control mechanism; and
a flow regulating valve responsive to the measure of the fluid flow rate to control the flow of fluid in the conduit.--

UNITED STATES PATENT AND TRADEMARK OFFICE
CERTIFICATE OF CORRECTION

PATENT NO. : 7,000,464 B2
APPLICATION NO. : 10/803149
DATED : February 21, 2006
INVENTOR(S) : McMillan et al.

Page 2 of 2

It is certified that error appears in the above-identified patent and that said Letters Patent is hereby corrected as shown below:

Column 12, Lns. 12-14, please cancel the text "19. The system of claim 15, further including: a driver circuit applying pulses of electrical current to the electrical power applicators." and insert the following claim:

-- 19. A system for measuring the flow of fluid in a conduit, comprising:
at least two heat detectors mounted at spaced positions from each other on the conduit measuring the temperature of the fluid and conduit at the spaced positions;
an amplifier forming a measure of difference in temperature sensed by the heat detectors;
a comparator forming a signal representative of the variation of the temperature difference measured by the heat detectors from an established temperature differential;
at least two electrical power applicators mounted at different locations on the conduit and allowing electrical current to flow in the conduit walls to heat the fluid in the conduit and maintain an established temperature differential between the spaced positions;
a control mechanism for obtaining measurements of the level of electrical power furnished to the power applicators to maintain the established temperature differential between the spaced positions; and
an indicator mechanism responsive to the control mechanism providing a measure of the fluid flow rate based on the measurements obtained by the control mechanism.--

Signed and Sealed this

Sixth Day of November, 2007

JON W. DUDAS
*Director of the United States Patent and Trademark Office*